United States Patent
Lee et al.

(10) Patent No.: US 8,660,568 B2
(45) Date of Patent: Feb. 25, 2014

(54) METHOD AND APPARATUS FOR INTERFERENCE CONTROL IN A WIRELESS COMMUNICATION SYSTEM WITH HIERARCHICAL CELL LAYOUT

(75) Inventors: Sang-Min Lee, Seoul (KR); Yung-Soo Kim, Seongnam-si (KR); Tak-Ki Yu, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 690 days.

(21) Appl. No.: 12/574,378

(22) Filed: Oct. 6, 2009

(65) Prior Publication Data
US 2010/0087203 A1   Apr. 8, 2010

(30) Foreign Application Priority Data
Oct. 6, 2008   (KR) .................. 10-2008-0097575

(51) Int. Cl.
*H04W 72/00* (2009.01)
(52) U.S. Cl.
USPC ..... 455/450; 455/447; 455/452.1; 455/452.2; 455/451; 455/422.1; 455/446; 455/448; 455/436; 455/444

(58) Field of Classification Search
USPC .............. 455/447, 452.2, 422.1, 63.1, 114.2, 455/448, 446, 451, 436, 444, 452.1; 370/329
See application file for complete search history.

(56) References Cited

U.S. PATENT DOCUMENTS

| | | | |
|---|---|---|---|
| 7,756,519 B2 * | 7/2010 | Barak et al. .................... | 455/447 |
| 7,907,578 B2 * | 3/2011 | Harvey et al. ................. | 370/338 |
| 2009/0042594 A1 * | 2/2009 | Yavuz et al. .................. | 455/522 |
| 2009/0042596 A1 * | 2/2009 | Yavuz et al. .................. | 455/522 |
| 2009/0257390 A1 * | 10/2009 | Ji et al. .......................... | 370/329 |

* cited by examiner

*Primary Examiner* — Khalid Shaheed
(74) *Attorney, Agent, or Firm* — The Farrell Law Firm, P.C.

(57) ABSTRACT

A method and apparatus for interference control in a wireless communication system with a hierarchical cell layout are provided. The method includes acquiring edge-bands of femto BSs within an area of the macro BS, determining whether an MS receiving a service from the macro BS is located in an area adjacent to the femto BS, and, if the MS is located in the area adjacent to the femto BS, allocating, to the MS, an edge-band of the femto BS to which the MS is adjacent.

34 Claims, 13 Drawing Sheets

METHOD AND APPARATUS FOR INTERFERENCE CONTROL IN A WIRELESS COMMUNICATION SYSTEM WITH HIERARCHICAL CELL LAYOUT

PRIORITY

This application claims priority under 35 U.S.C. §119(a) to a Korean Patent Application filed in the Korean Intellectual Property Office on Oct. 6, 2008 and assigned Serial No. 10-2008-0097575, the contents of which are herein incorporated by reference.

BACKGROUND OF THE INVENTION

1. Field of the Invention

The present invention relates to a method and an apparatus for interference control in a wireless communication system with a hierarchical cell layout. More particularly, the present invention relates to a method and an apparatus for, if a femto cell exists within an area of a macro cell, minimizing the interference of the femto cell on the macro cell.

2. Description of the Related Art

In recent years, in a cellular wireless communication system, a femto cell concept has been proposed to address problems resulting from electric wave shadow areas, which can be caused by a movement between Base Stations (BSs) or a poor channel state, while a high-level data service is provided. In contrast with a macro cell, a femto cell has a very small cell area. A plurality of femto cells can be installed within one macro cell area.

The macro cell and femto cell can use the same or different frequency bands. If a macro cell and a femto cell use different frequency bands from each other, interference is generated only by a signal leaked out of a frequency band used by each respective cell. The above generation of interference can be addressed by allocating less power to the femto cell but, because the femto cell is required to use an additional frequency band, there is a problem that efficiency of frequency band use is reduced. However, if the macro cell and femto cell use the same frequency band, there is no need to use an additional frequency band, but much more interference is generated between the macro cell and femto cell.

The conventional art provides a variety of techniques to control interference between cells. For example, there is a Fractional Frequency Reuse (FFR) technique for maintaining efficiency of an entire cell while improving an efficiency of a cell boundary portion. As illustrated in FIG. 1, after dividing a cell area into an internal area and an external area, the FFR technique sets a frequency reuse rate of the cell internal area to '1' and sets a frequency reuse rate of the cell external area to '3', thus allowing orthogonality of a frequency band for an external area of each cell. After dividing a frequency band for the cell external area into three fractional bands, the FFR technique uses the fractional band to take orthogonality in an external area of each cell.

However, the FFR technique is for a horizontal cell layout in which there are horizontally continuous cells of a similar size, and has a problem that it is difficult to be applied to a hierarchical cell layout in which there is the femto cell within the macro cell.

SUMMARY OF THE INVENTION

The present invention has been made to address at least the above problems and/or disadvantages and to provide at least the advantages described below. Accordingly, one aspect of the present invention is to provide a method and apparatus for interference control in a wireless communication system with a hierarchical cell layout.

Another aspect of the present invention is to provide a method and apparatus for minimizing the interference of a femto cell on a macro cell in a wireless communication system with a hierarchical cell layout.

A further aspect of the present invention is to provide a method and apparatus for frequency band allocation in a wireless communication system with a hierarchical cell layout.

A further another aspect of the present invention is to provide a method and apparatus for receiving a service from a macro cell while allocating a predetermined frequency band to a Mobile Station (MS) adjacent to a femto cell in a wireless communication system with a hierarchical cell layout.

The above aspects are achieved by providing a method and apparatus for interference control in a wireless communication system with a hierarchical cell layout.

According to one aspect of the present invention, a method of a macro Base Station (BS) for interference alleviation in a wireless communication system with a hierarchical cell layout is provided. The method includes acquiring edge-bands of femto BSs belonging within an area of the macro BS, determining whether an MS receiving a service from the macro BS is located in an area adjacent to the femto BS, and, if the MS is located in the area adjacent to the femto BS, allocating, to the MS, an edge-band of the femto BS to which the MS is adjacent.

According to another aspect of the present invention, a method of a femto BS for interference alleviation in a wireless communication system with a hierarchical cell layout is provided. The method includes acquiring an edge-band of the femto BS in a whole available frequency band, and restricting a use of the edge-band and allocating a resource to an MS receiving a service from the femto BS.

According to a further aspect of the present invention, an apparatus of a macro BS for interference alleviation in a wireless communication system with a hierarchical cell layout is provided. The apparatus includes a storage unit and a scheduler. The storage unit stores edge-bands of femto BSs within an area of the macro BS. The scheduler determines whether an MS receiving a service from the macro BS is located in an area adjacent to the femto BS and, if the MS is located in the area adjacent to the femto BS, allocates the MS an edge-band of the femto BS to which the MS is adjacent.

According to yet another aspect of the present invention, an apparatus of a femto BS for interference alleviation in a wireless communication system with a hierarchical cell layout is provided. The apparatus includes an edge-band manager and a scheduler. The edge-band manager acquires an edge-band of the femto BS in a whole available frequency band. The scheduler restricts use of the edge-band and allocates a resource to an MS receiving a service from the femto BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
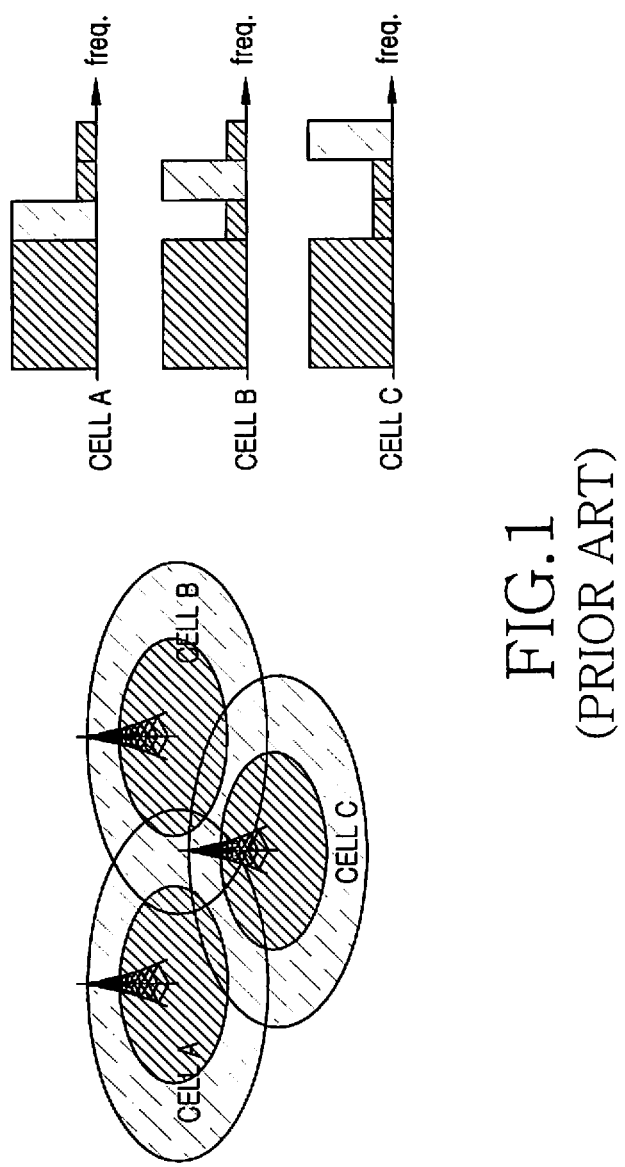
FIG. 1 is a diagram illustrating a Fractional Frequency Reuse (FFR) technique in a conventional wireless communication system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention The present invention includes a frequency band allocation method and apparatus for minimizing the interference of a femto cell on a macro cell in a wireless communication system with a hierarchical cell layout. According to the present invention, the wireless communication system with the hierarchical cell layout represents a wireless communication system in which communication systems of different cell sizes coexist. Described embodiments of the present invention include, for example, a macro cell and a femto cell, but the present invention is applicable to all wireless communication systems of different cell sizes.

In the following description of embodiments the present invention, for example, it is assumed that there is a femto cell within an area of a macro cell, and the macro cell and femto cell use the same frequency band. A macro Mobile Station (MS) represents an MS receiving a service from a macro Base Station (BS), and a femto MS represents an MS receiving a service from a femto BS.

In general, in the wireless communication system of the hierarchical layout in which the macro cell and femto cell exist, the macro cell and femto cell interfere with each other.

Figure 2:
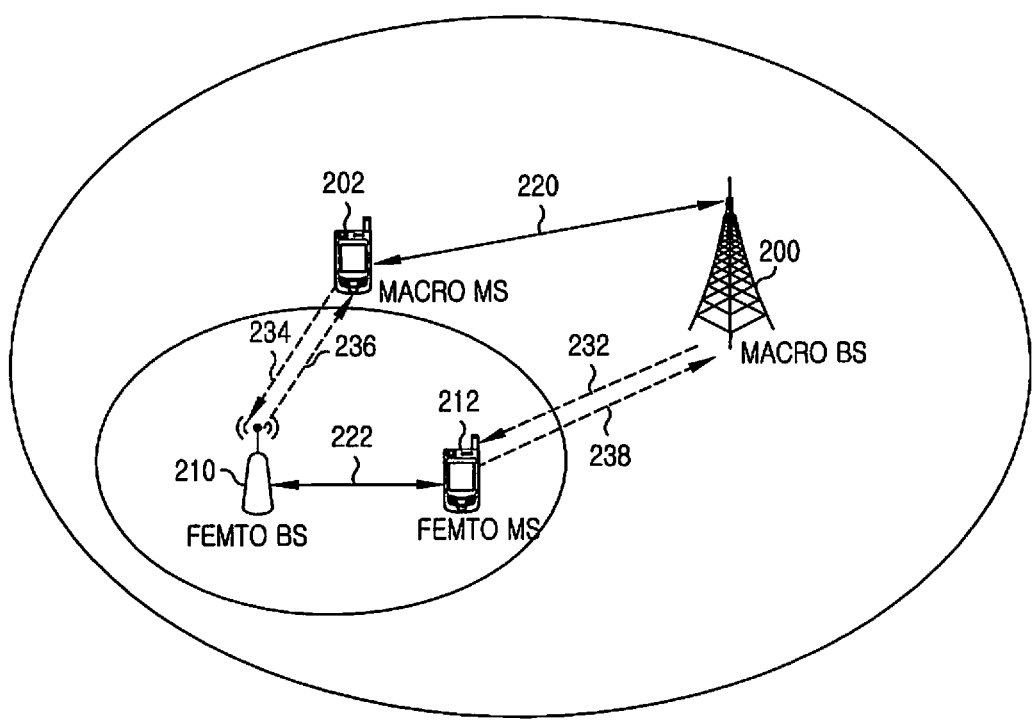
FIG. 2 is a diagram illustrating an interference pattern between a macro cell and a femto cell in a wireless communication system of a general hierarchical layout.

FIG. 2 illustrates interference between a macro cell and a femto cell in a wireless communication system of a general hierarchical layout.

Referring to FIG. 2, interference between the macro cell and femto cell can be divided into four main types:

interference 232 on a femto MS 212, which occurs during a downlink signal transmission 220 from a macro BS 200 to a macro MS 202;

interference 234 on a femto BS 210, which occurs during an uplink signal transmission 220 from the macro MS 202 to the macro BS 200;

interference 236 on the macro MS 202, which occurs during a downlink signal transmission 222 from the femto BS 210 to the femto MS 212; and interference 238 on the macro BS 200, which occurs during an uplink signal transmission 222 from the femto MS 212 to the femto BS 210.

Minimizing the interferences 234 and 236 between the femto BS 210 and the macro MS 202 is generally considered to be more important than minimizing the interferences 232 and 238 between the macro BS 200 and femto MS 212, because it is more important to stably operate a macro cell providing basic communication coverage than a femto cell additionally disposed in the macro cell.

Thus, an apparatus for minimizing interference between a femto BS and a macro MS according to an embodiment of the present invention is described as follows, with reference to FIG. 3.

Figure 3:
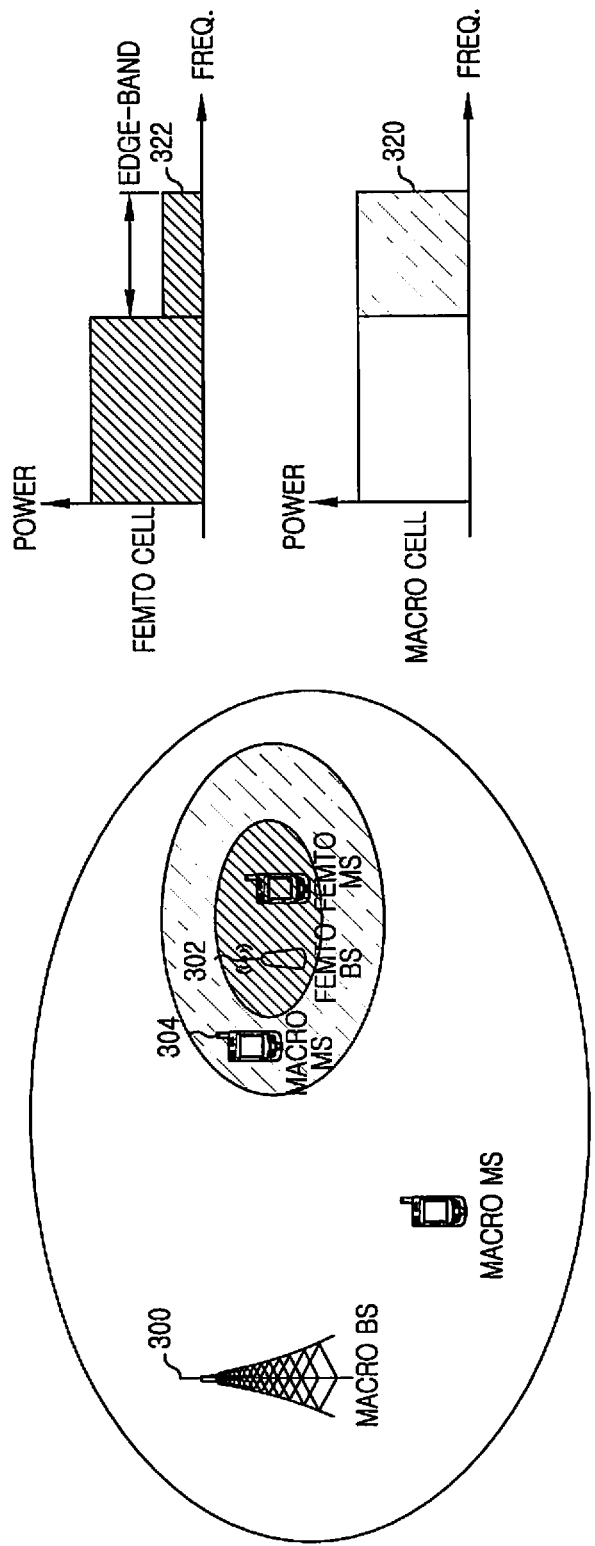
FIG. 3 is a diagram illustrating a frequency band allocation structure when using a single carrier in a wireless communication system of a hierarchical layout according to the present invention.

FIG. 3 illustrates a frequency band allocation structure when using a single carrier in a wireless communication system of a hierarchical layout according to the present invention.

As illustrated in FIG. 3, according to an embodiment of the present invention, parts of a whole frequency band used by a macro cell and femto cell are designated as edge-bands 320 and 322, respectively. A macro MS 304 adjacent to the femto cell is permitted to use the edge-band 322. The use of the edge-band 320 in the femto cell is restricted. Each femto cell can designate an edge-band of a different frequency position and size, and can further designate an edge-band of a different position and size for uplink/downlink.

According to an embodiment of the present invention, after an edge-band is designated by a femto cell, a macro BS 300 allocates an edge-band designated by a specific femto BS 302 to a macro MS 304 positioned in an area adjacent to a cell of the specific femto BS 302 to transmit/receive data. By not using the edge-band or using the edge-band at low power, the specific femto BS 302 alleviates interference.

The edge-band allocation according to an embodiment of the present invention is equally applicable to a multi-carrier system as well as the single carrier system illustrated in FIG. 3. For example, FIG. 4 is a diagram illustrating a frequency band allocation structure when using a multi-carrier in a wireless communication system of a hierarchical layout according to an embodiment of the present invention.

Figure 4:
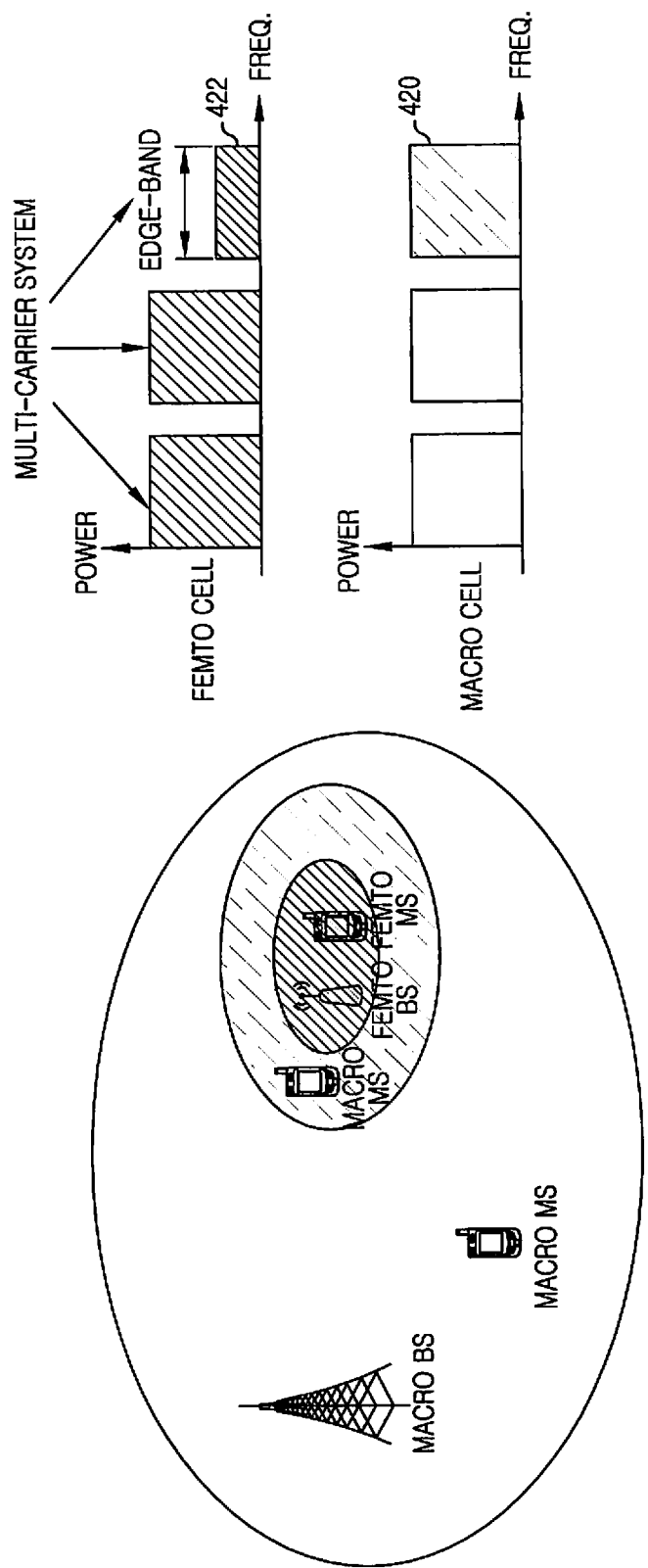
FIG. 4 is a diagram illustrating a frequency band allocation structure when using a multi-carrier in a wireless communication system of a hierarchical layout according to the present invention.

As illustrated in FIG. 4, a multi-carrier system can designate edge-bands 420 and 422 in a carrier unit. If the multi-carrier system uses an edge-band of the carrier unit, the multi-carrier system can more effectively alleviate interference compared to the single carrier system. For example, when the single carrier system uses a partial frequency band as an edge-band, in a channel design aspect, it is difficult to transmit/receive all control channels through the edge-band. Thus, the single carrier system can only transmit/receive a data channel and partial control channel through the edge-band. However, since each carrier can independently have all control channels, although using only a carrier designated as the edge-band, a multi-carrier system according to an embodiment of the present invention may use all control channels and data channels without any interference.

Figure 5:
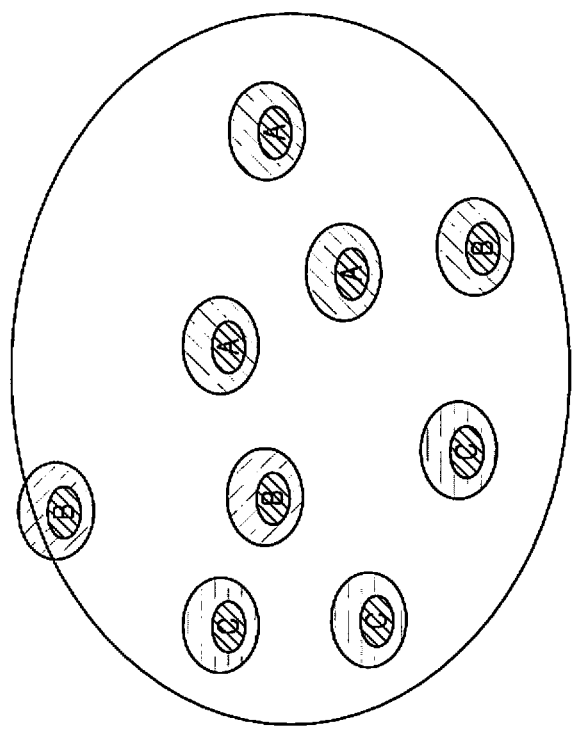
FIG. 5 is a diagram illustrating a frequency band allocation structure for a plurality of femto cells belonging to one macro cell in a wireless communication system of a hierarchical layout according to an exemplary embodiment of the present invention.
Figure 5:
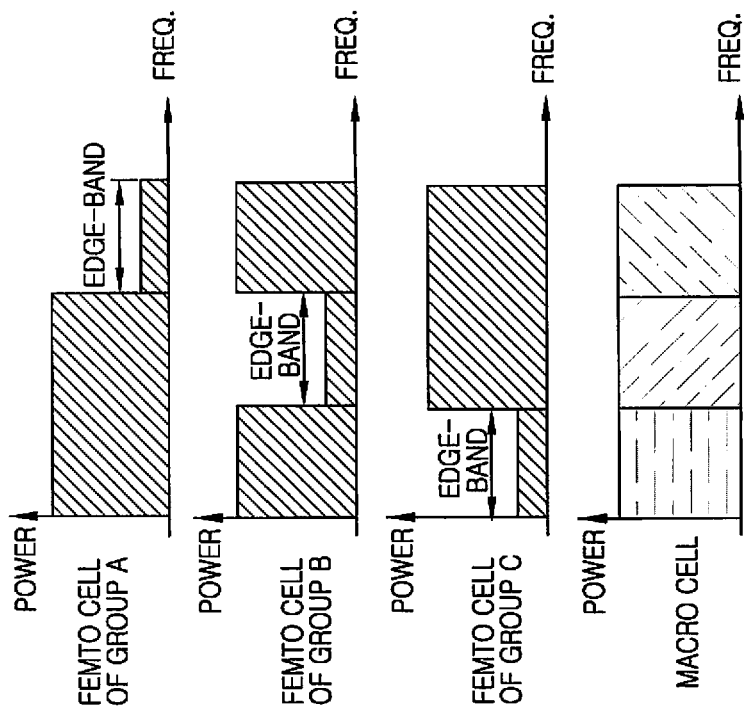
Figure 6:
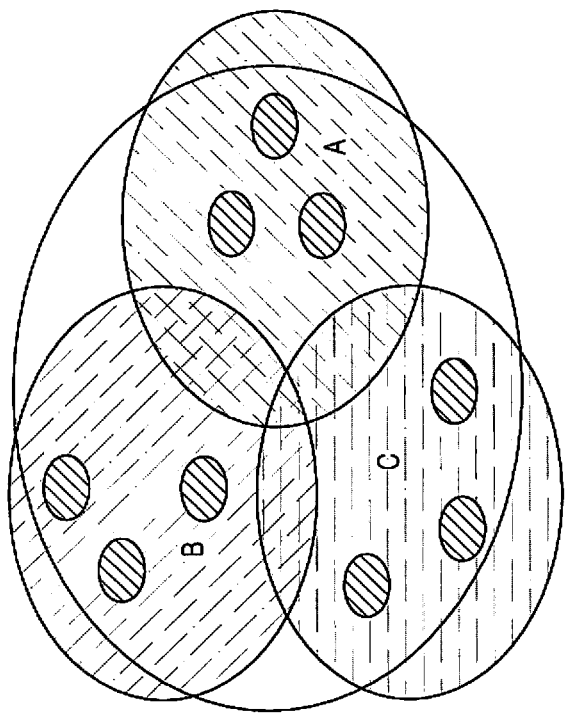
FIG. 6 is a diagram illustrating a frequency band allocation structure for a plurality of femto cells belonging to one macro cell in a wireless communication system of a hierarchical layout according to another exemplary embodiment of the present invention.
Figure 6:
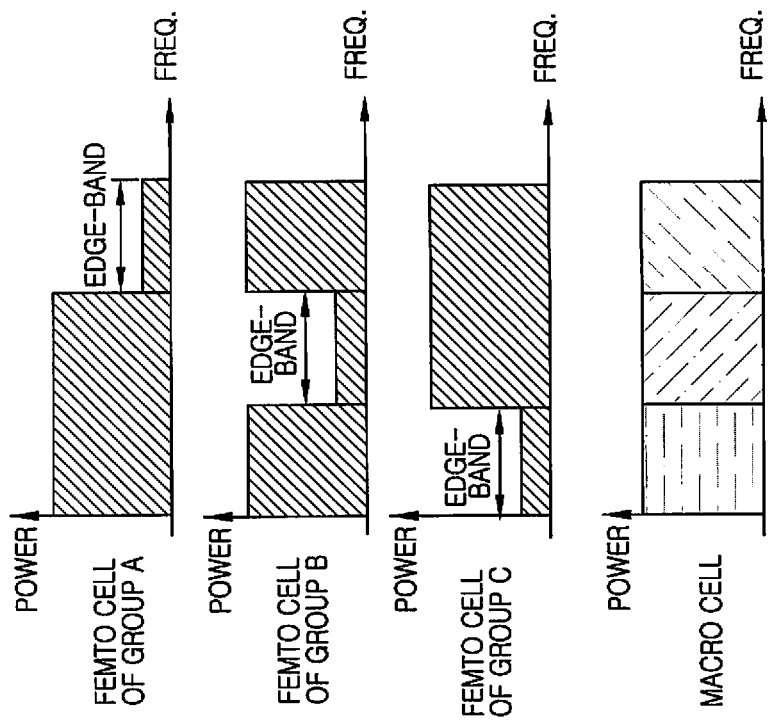

FIG. 5 is a diagram illustrating a frequency band allocation structure in which a plurality of femto cells belong to one macro cell in a wireless communication system of a hierarchical layout according to an embodiment of the present invention. FIG. 6 is a diagram illustrating a frequency band allocation structure in which a plurality of femto cells belong to one macro cell in a wireless communication system of a hierarchical layout according to another embodiment of the present invention. As illustrated in FIGS. 5 and 6, each femto cell can decentralize a load of the whole frequency band by setting an edge-band to a different frequency position. That is, if an edge-band of each femto cell is differently designated, even frequency bands allocated to macro MSs adjacent to the femto cell are not concentrated in one place, and these allocated frequency bands are decentralized in different frequency positions depending on the adjacent femto cell. At this time, as illustrated in FIG. 5, an edge-band can be set to a different frequency position by a femto cell. Alternatively, as illustrated in FIG. 6, by forming groups of femto cells within constant areas of a macro cell, an edge-band can be set to a different frequency position by group.

Figure 7:
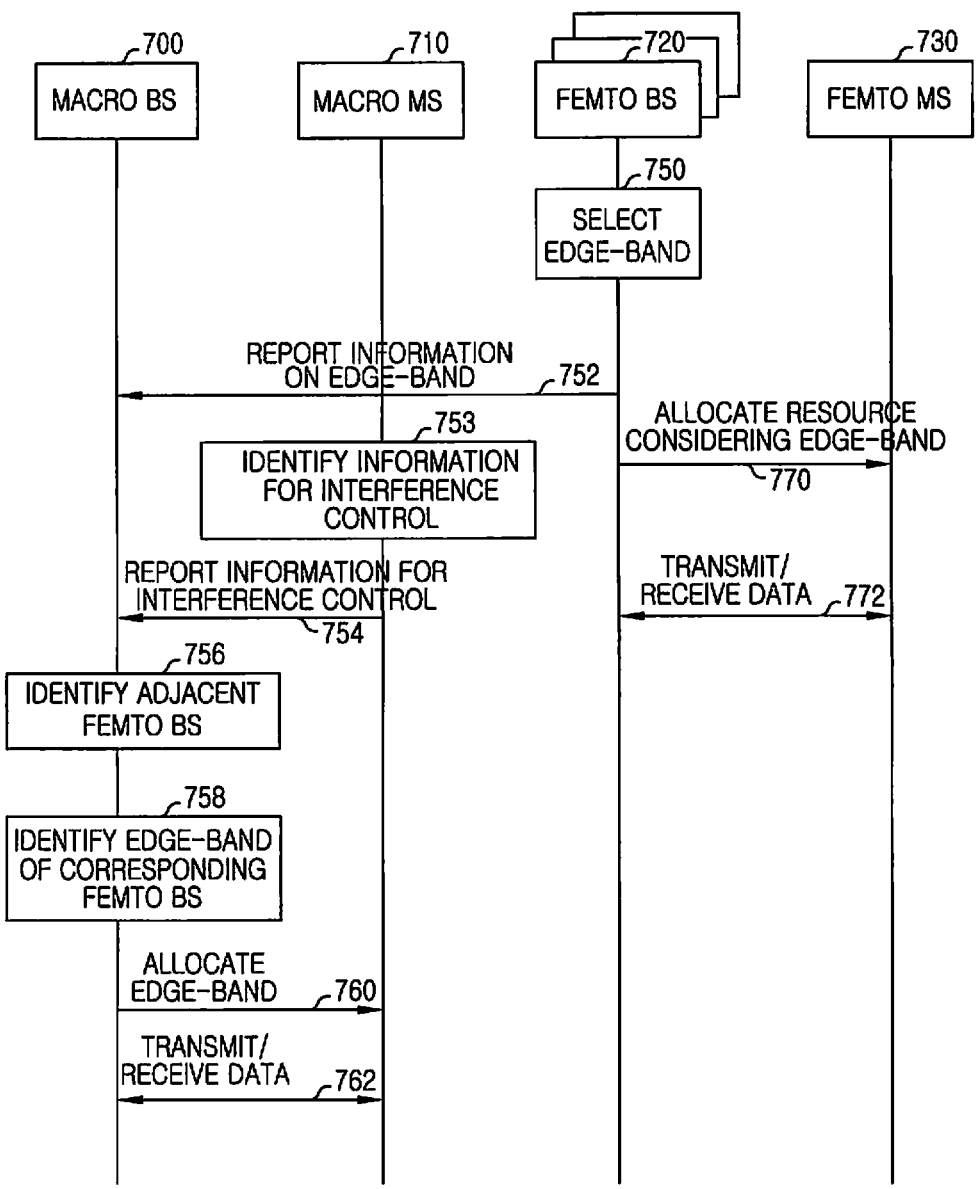
FIG. 7 is a ladder diagram illustrating a signal flow for frequency band allocation in a wireless communication system of a hierarchical layout according to an exemplary embodiment of the present invention.

FIG. 7 illustrates a signal flow for frequency band allocation in a wireless communication system of a hierarchical layout according to an embodiment of the present invention.

Referring to FIG. 7, in step 750, each one of femto BSs 720 selects a frequency band to be used as an edge-band. At this time, when using a single carrier communication system, each femto BS 720 can select a predetermined number of subcarriers constituting the single carrier as the edge-band and, when using a multi-carrier communication system, each femto BS 720 can select a predetermined number of carriers as the edge-band. In step 752, each femto BS 720 reports information on the selected edge-band to a macro BS 700 including itself. At this time, the macro BS 700 receives the information on the edge-band from the femto BSs 720 belonging to its own area, and stores the received information.

In step 753, at least once during every one of a predetermined period, a macro MS 710 receiving a service from the macro BS 700 identifies information representing whether the macro MS 710 is adjacent to a femto cell, the kind of the adjacent femto cell, etc., for interference control. The macro MS 710 measures a Signal to Interference Noise Ratio (SINR) from each BS every predetermined period or collects information representing its own current position or area. Then, in step 754, the macro MS 710 reports the information identified for the interference control to the macro BS 700. Since the macro MS 710 has previously received a list of femto BS candidates representing femto cells belonging to the macro BS 700 from the macro BS 700, the macro MS 710 can periodically measure SINRs for the femto BSs 720 included in the candidate list.

In step 756, the macro BS 700 determines whether the macro MS 710 is adjacent to the femto BS according to the information received from the macro MS 710. If the macro MS 710 is adjacent to the femto BS, identifies whether the macro MS 710 is adjacent to any femto BS. If the macro MS 710 is adjacent to a specific femto BS 720, in step 758, the macro BS 700 identifies an edge-band of the specific femto BS 720.

In step 760, the macro BS 700 allocates the identified edge-band to the macro MS 710 and then, in step 762, transmits/receives data with the macro MS 710 through the allocated edge-band.

However, if there is a femto MS 730 that is in access to the femto BS 720 itself, in step 770, the femto BS 720 allocates a resource to a corresponding femto MS 730 considering an edge-band. In step 772, the femto BS 720 transmits/receives data with the femto MS 730 through the allocated resource. Here, the femto BS 720 either allocates only a frequency band excepting the edge-band to the femto MS 730 or allocates the edge-band to a femto MS in which, owing to a good channel state, signal transmission/reception based on low power is possible.

Figure 8:
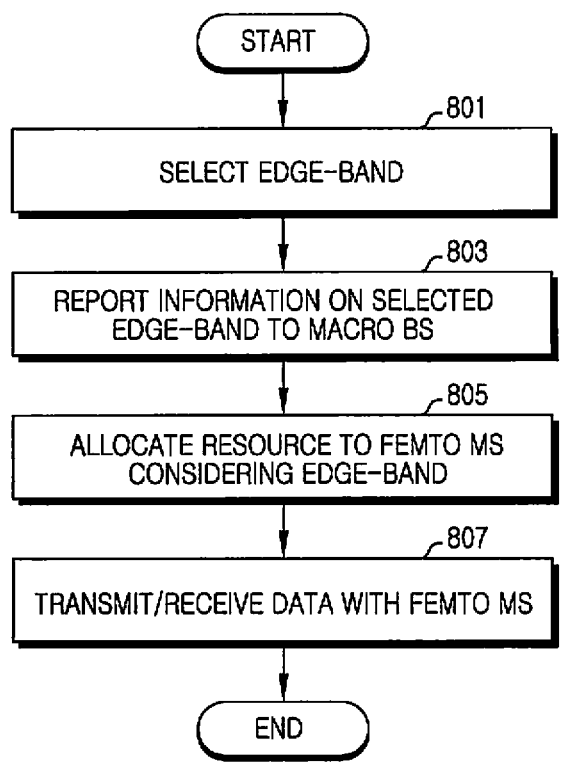
FIG. 8 is a flow diagram illustrating an operation procedure of a femto Base Station (BS) in a wireless communication system of a hierarchical layout according to an exemplary embodiment of the present invention.

FIG. 8 is a flow diagram illustrating an operation procedure of a femto BS in a wireless communication system of a hierarchical layout according to an embodiment of the present invention.

Referring to FIG. 8, in step 801, a femto BS selects a frequency band to be used as an edge-band. At this time, when using a single carrier communication system, the femto BS can select a predetermined number of subcarriers constituting the single carrier as the edge-band. When using a multi-carrier communication system, the femto BS can select a predetermined number of carriers as the edge-band.

In step 803, the femto BS reports information on the selected edge-band to a macro BS belonging to itself and then, in step 805, allocates a resource to a femto MS that accesses the femto BS considering the edge-band. Here, the femto BS can either allocate only a frequency band that does not include the edge-band to the femto MS or allocate only a frequency band that does not include the edge-band to femto MSs having poor channel states and allocate the edge-band to a femto MS in which, due to a good channel state, signal transmission/reception based on low power is possible.

In step 807, the femto BS transmits/receives data with the femto MS through the allocated resource, and terminates the procedure.

Figure 9:
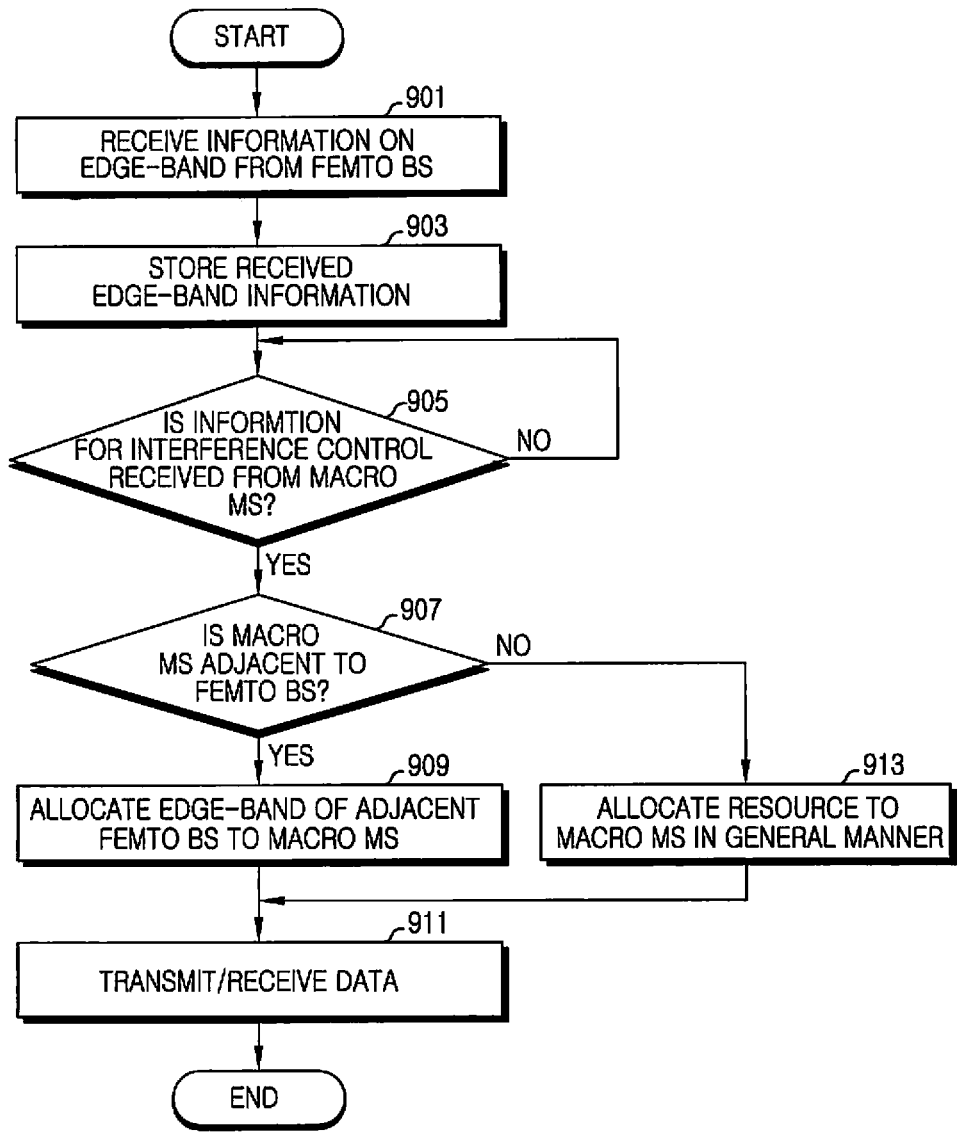
FIG. 9 is a flow diagram illustrating an operation procedure of a macro BS in a wireless communication system of a hierarchical layout according to an exemplary embodiment of the present invention.

FIG. 9 is a flow diagram illustrating an operation procedure of a macro BS in a wireless communication system of a hierarchical layout according to an embodiment of the present invention.

Referring to FIG. 9, in step 901, the macro BS receives information regarding an edge-band from a femto BS. In step 903, the macro BS stores the received information on the edge-band from the femto BS.

In step 905, the macro BS determines whether information for interference control is received from a macro MS. When interference control information is received, in step 907, the macro BS analyzes the received information and determines whether the macro MS is adjacent to a femto BS. The interference control information can be an SINR of a signal received by the macro MS from each BS, or position or area information regarding the macro MS. When SINRs for femto BSs are received from the macro MS, the macro BS can determine whether the SINR is greater than or equal to a threshold value and determine whether the macro MS is adjacent to the femto BS. When the position information is received from the macro MS, the macro BS can determine a position of the macro MS and whether a distance from the macro MS to the femto BS is less than or equal to a threshold value and determine whether the macro MS is adjacent to the femto BS. Also, when the area information is received from the macro MS, the macro BS can determine whether the area is an area adjacent to the femto BS and determine if the macro MS is adjacent to the femto BS. When using the position information, the macro BS must store position information on each femto BS in advance. When using the area information, as illustrated in FIG. 4, the macro BS must group adjacent femto BSs among femto BSs existing in its own area and store information on a geographical area occupied by each group in advance. At this time, femto BSs belonging to each group may have the same edge-band.

If the macro MS is adjacent to the femto BS, in step 909, the macro BS identifies an edge-band of the femto BS to which the macro MS is adjacent, and allocates the identified edge-band to the macro MS, and proceeds to step 911. In step 909, if the macro MS is adjacent to a plurality of femto BSs, the macro BS can either allocate an edge-band of a femto BS of the largest SINR or least distance to the macro MS or allocate a frequency band at which edge-bands of the plurality of adjacent femto BSs to the macro MS are superposed.

However, when the macro MS is not adjacent to a femto BS, the macro BS proceeds to step 913 and allocates a frequency band to the macro MS, according to a general method. In step 911, the macro BS performs data transmission/reception with the macro MS through the allocated edge-band or frequency band, and terminates the procedure according to an embodiment of the present invention.

Figure 10:
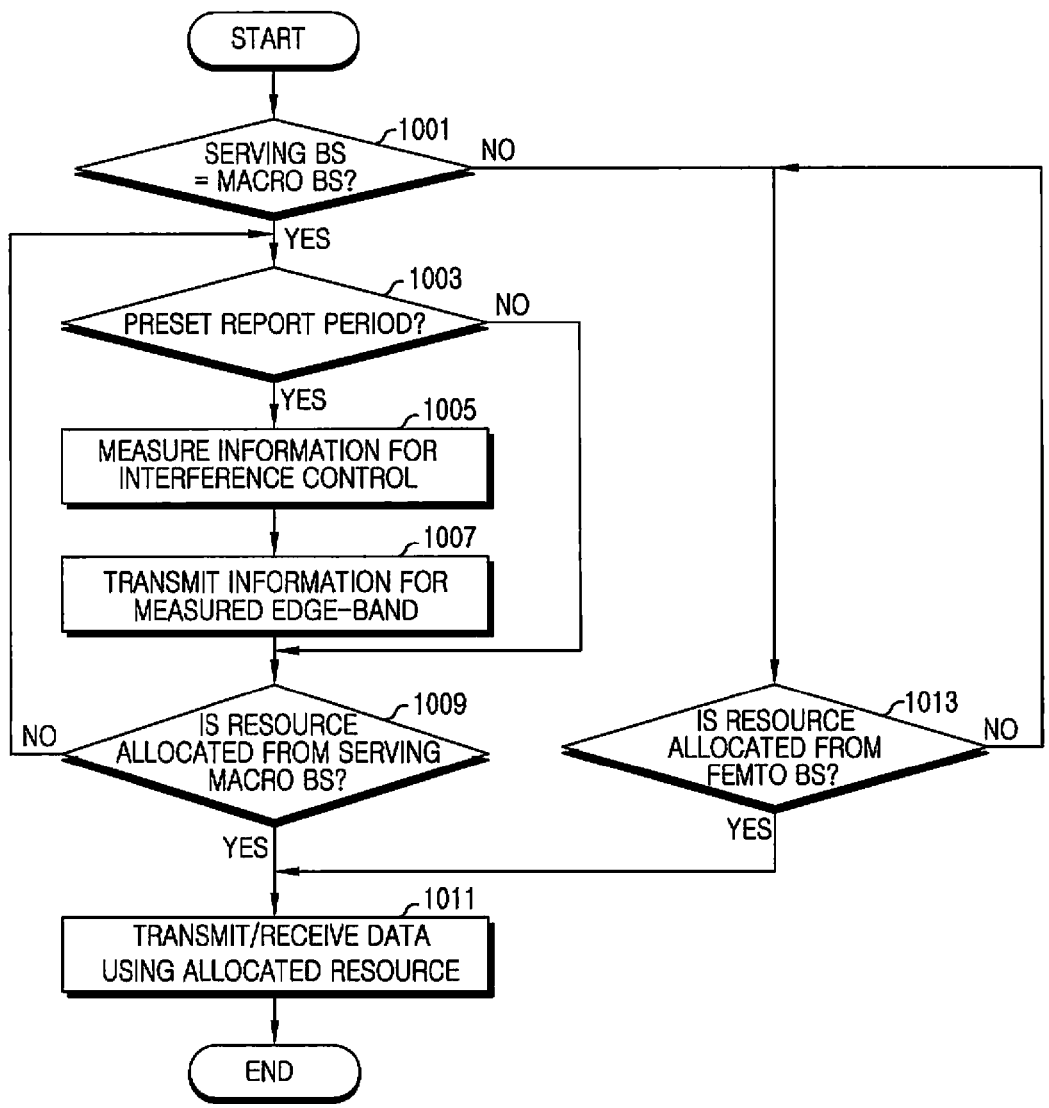
FIG. 10 is a flow diagram illustrating an operation procedure of a Mobile Station (MS) in a wireless communication system of a hierarchical layout according to an exemplary embodiment of the present invention.

FIG. 10 is a flow diagram illustrating an operation procedure of an MS in a wireless communication system of a hierarchical layout according to an exemplary embodiment of the present invention.

Referring to FIG. 10, in step 1001, the MS determines whether its own serving BS is a macro BS.

If the serving BS is a macro BS, in step 1003, the MS determines whether a current time is within a preset report period. If the current time is not within the preset report period, the MS proceeds to step 1009. If the current time is within the preset report period, in step 1005, the MS measures interference control information with respect to a femto BS. Then, the MS proceeds to step 1007 and reports the measured interference control information to the macro BS. Here, the MS can measure, as the interference control information, an SINR of a signal received from each BS, its own position or area information, etc. At this time, by receiving a list of femto BS candidates representing femto cells belonging to the macro BS from the serving macro BS in advance, the MS can periodically measure and report SINRs for femto BSs included in the candidate list. At this time, the SINR reporting is generally performed for handover. The SINR reporting for handover can be used as it is without performing a separate additional measurement or procedure.

Then, in step 1009, the MS determines whether a resource is allocated from the serving macro BS. If the resource is not allocated, the MS returns to step 1003 and again performs subsequent steps 1005 through 1009. If the resource is allocated, in step 1011, the MS performs data transmission/reception with the femto BS using the allocated resource. Then, the MS terminates the procedure.

However, if the serving BS is not a macro BS but that the serving BS is a femto BS, in step 1013, the MS determines whether a resource is allocated from the femto BS. If the resource is allocated, the MS performs data transmission/reception with the femto BS using the resource allocated in step 1011 and terminates the procedure.

Figure 11:
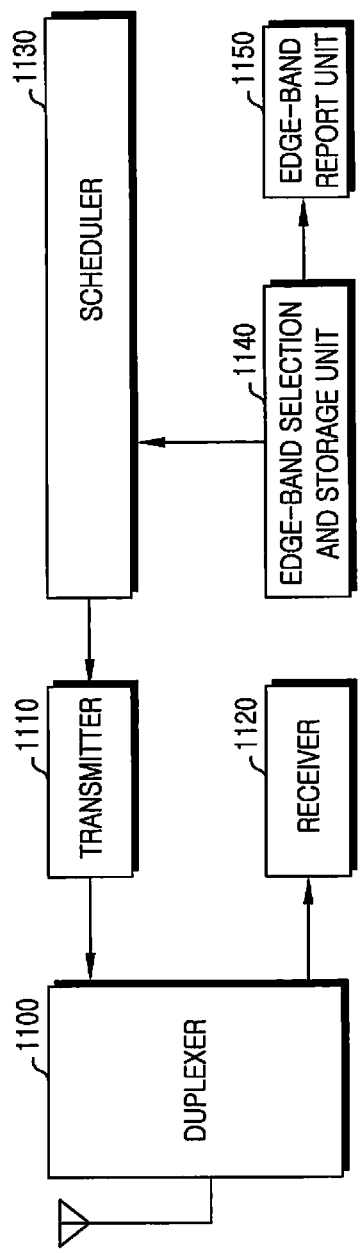
FIG. 11 is a block diagram illustrating a construction of a femto BS in a wireless communication system of a hierarchical layout according to an exemplary embodiment of the present invention.

FIG. 11 is a block diagram illustrating a construction of a femto BS in a wireless communication system of a hierarchical layout according to an embodiment of the present invention.

As illustrated in FIG. 11, the femto BS includes a duplexer 1100, a transmitter 1110, a receiver 1120, a scheduler 1130, an edge-band selection and storage unit 1140, and an edge-band report unit 1150.

The duplexer 1100 transmits a transmit signal received from the transmitter 1110 through an antenna according to a duplexing scheme, and provides a receive signal from the antenna to the receiver 1120.

The transmitter 1110 converts a transmit signal received from the scheduler 1130 into a high frequency signal and provides the high frequency signal to the duplexer 1100. The receiver 1120 converts a receive signal received from the duplexer 1100 into a baseband signal. For example, if the wireless communication system uses an Orthogonal Frequency Division Multiplexing (OFDM) scheme, the transmitter 1110 includes an encoder, an OFDM modulator, a Digital-to-Analog Converter (DAC), and a Radio Frequency (RF) processor, and the receiver 1120 includes an RF processor, an Analog-to-Digital Converter (ADC), an OFDM demodulator, and a decoder.

The scheduler 1130 performs scheduling to provide a service to femto MSs. Particularly, according to an embodiment of the present invention, the scheduler 1130 performs resource allocation for the femto MSs considering an edge-band received from the edge-band selection and storage unit 1140. The scheduler 1130 can either allocate only a frequency band that does not include the edge-band to the femto MS, or allocate only a frequency band that does not include the edge-band to femto MSs of a poor channel state and allocate the edge-band to femto MSs in which, owing to good channel states, signal transmission/reception based on low power is possible.

The edge-band selection and storage unit 1140 selects and stores a frequency band to be used as an edge-band by the femto BS. At this time, when using a single carrier, each femto BS can select a predetermined number of subcarriers constituting the single carrier as the edge-band. When using a multi-carrier, each femto BS can select a predetermined number of carriers as the edge-band. At this time, the edge-band can be also set by a service provider or a user.

The edge-band report unit 1150 reports information on the edge-band selected in the edge-band selection and storage unit 1140 to a macro BS to which the femto BS belongs.

Figure 12:
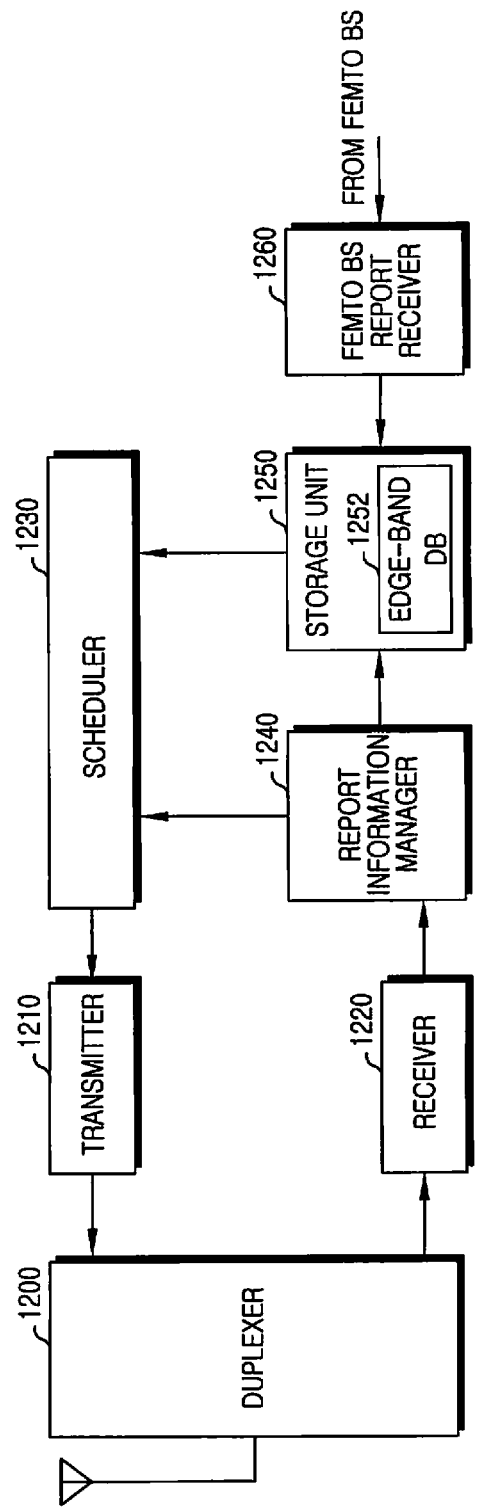
FIG. 12 is a block diagram illustrating a construction of a macro BS in a wireless communication system of a hierarchical layout according to an exemplary embodiment of the present invention.

FIG. 12 is a block diagram illustrating a construction of a macro BS in a wireless communication system of a hierarchical layout according to an embodiment of the present invention.

As illustrated in FIG. 12, the macro BS includes a duplexer 1200, a transmitter 1210, a receiver 1220, a scheduler 1230, a report information manager 1240, a storage unit 1250, a femto BS report receiver 1260, and an edge-band DataBase (DB) 1252 included in the storage unit 120.

The duplexer 1200 transmits a transmit signal received from the transmitter 1210 through an antenna according to a duplexing scheme, and provides a receive signal from the antenna to the receiver 1220.

The transmitter 1210 converts a transmit signal received from the scheduler 1230 into a high frequency signal and provides the high frequency signal to the duplexer 1200. The receiver 1220 converts a receive signal received from the duplexer 1200 into a baseband signal. For example, if the wireless communication system uses an Orthogonal Frequency Division Multiplexing (OFDM) scheme, the transmitter 1210 includes an encoder, an OFDM modulator, a Digital-to-Analog Converter (DAC), and a Radio Frequency (RF) processor, and the receiver 1220 includes an RF processor, an Analog-to-Digital Converter (ADC), an OFDM demodulator, and a decoder.

The scheduler 1230 performs scheduling for providing a service to macro MSs. Particularly, according to an embodiment of the present invention, the scheduler 1230 performs resource allocation for the macro MSs on the basis of information received through the report information manager 1240. More specifically, the scheduler 1230 receives interference control information from a macro MS through the report information manager 1240 and determines whether the macro MS is adjacent to a femto BS. If the macro MS is adjacent to the femto BS, the scheduler 1230 identifies an edge-band of an adjacent femto BS through the storage unit 1250 and allocates the edge-band as a resource of the macro MS.

The report information manager 1240 analyzes interference control information in a message received from a macro MS through the receiver 1220 and provides the analyzed information to the scheduler 1230 or the storage unit 1250. The interference control information can be an SINR of a signal received by the macro MS from each BS or position or area information regarding the macro MS itself.

The storage unit 1250 stores a program for a general operation of the macro BS and other various data. The storage unit 1250 includes the edge-band DB 1252, thus storing edge-bands of femto BSs belonging to an area of the macro BS. The edge-bands of the femto BSs can be different frequency bands according to respective femto BSs, or the edge-bands can alternatively be the same frequency band among adjacent femto BSs.

The femto BS report receiver 1260 receives information on an edge-band of each femto BS from the femto BSs belonging to the area of the macro BS and provides the received information to the storage unit 1250.

Figure 13:
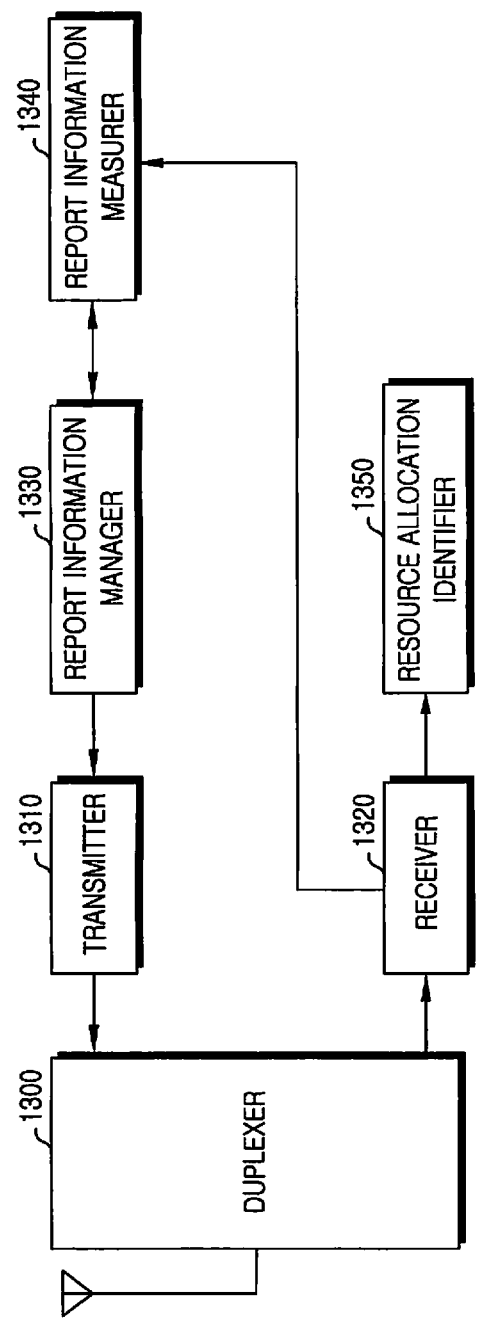
FIG. 13 is a block diagram illustrating a construction of an MS in a wireless communication system of a hierarchical layout according to an exemplary embodiment of the present invention.

FIG. 13 is a block diagram illustrating a construction of an MS in a wireless communication system of a hierarchical layout according to an exemplary embodiment of the present invention.

As illustrated in FIG. 13, the MS includes a duplexer 1300, a transmitter 1310, a receiver 1320, a report information manager 1330, a report information measurer 1340, and a resource allocation identifier 1350.

The duplexer 1300 transmits a transmit signal received from the transmitter 1310 through an antenna according to a duplexing scheme, and provides a receive signal from the antenna to the receiver 1320.

The transmitter 1310 converts a transmit signal received from the report information manager 1330 into a high frequency signal and provides the high frequency signal to the duplexer 1300. The receiver 1320 converts a receive signal received from the duplexer 1300 into a baseband signal and provides the baseband signal to the report information measurer 1340 or the resource allocation identifier 1350. For example, if the wireless communication system uses an OFDM scheme, the transmitter 1310 includes an encoder, an OFDM modulator, a DAC, and an RF processor, and the receiver 1320 includes an RF processor, an ADC, an OFDM demodulator, and a decoder.

The report information manager 1330 determines whether a serving BS of the MS is a macro BS or a femto BS. If the serving BS is a macro BS, the report information manager 1330 controls the report information measurer 1340 at least once every preset period and controls a function of reporting interference control information to the macro BS.

Under control of the report information manager 1330, the report information measurer 1340 measures and collects interference control information with a femto BS at least once every preset period and provides the collected information to the report information manager 1330. The report information measurer 1340 can either measure an SINR as the interference control information or can collect position information on the MS itself. At this time, the report information measurer 1340 receives and stores a list of femto BS candidates representing femto cells belonging to a serving macro BS from the serving macro BS, thereby enabling the report information measurer 1340 to periodically measure SINRs for femto BSs included in the candidate list. The report information measurer 1340 can also receive an electric wave sent from a Global Positioning System (GPS) satellite through a GPS receiver (not shown) and collect position information regarding the MS.

The resource allocation identifier 1350 identifies a resource allocated to the MS itself in a MAP received through the receiver 1320, and performs data transmission/reception with the serving macro BS through the allocated resource.

In the above description, a femto BS sets its own edge-band and informs a macro BS of the set edge-band. However, the macro BS can set and provide information regarding edge-bands of femto BSs included in its own area, or a service provider can designate the edge-bands.

The present invention may be used together with a conventional FFR scheme. In a wireless communication system with a hierarchical layout, a scheme according to the present invention may be used between a macro cell and a femto cell, while an FFR scheme is be used between the macro cells.

If a macro MS receiving a service from a macro cell is adjacent to a femto cell in a wireless communication system with a hierarchical cell layout, a method and apparatus according to present invention can allocate a predetermined frequency band predefined with the femto cell to the macro MS, thereby being able to set a transmission resource of the macro MS that is at a boundary of femto cells orthogonally with a transmission resource of a femto MS and decrease the interference of the femto cell on the macro cell. Accordingly, the femto cell can reuse a frequency band of the macro cell without using an additional band. Also, because a method and apparatus according to present invention may use conventional feedback information for frequency band allocation, an MS does not have to additionally provide other feedback information, and an efficient operation is possible in both a multi-carrier system and a single carrier system. According to the present invention, a multi-carrier system designates an edge-band on a per-carrier basis, thereby enabling an edge-band to include all control channels and data channels, and enabling reception of all channels with no interference. The present invention can also be applied simultaneously with a conventional FFR technology.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of a macro Base Station (BS) for interference alleviation in a wireless communication system with a hierarchical cell layout, the method comprising:

determining whether a Mobile Station (MS) receiving a service from the macro BS is located in an area adjacent to a femto BS included within an area of the macro BS; and if the MS is located in the area adjacent to the femto BS, allocating, to the MS, an edge-band of the femto BS to which the MS is adjacent, wherein the macro BS and the femto BS use a same frequency band, wherein the edge-band is determined as a part band of the same frequency band used by the macro BS and the femto BS, and wherein the femto BS uses the edge-band at a lower power than a threshold power.

2. The method of claim 1, wherein, if the femto BS uses a single carrier, the edge-band is constructed in a subcarrier unit and, if the femto BS uses a multi-carrier, the edge-band is constructed in a carrier unit.

3. The method of claim 1, wherein the edge-band is constructed in different frequency positions or different sizes for uplink and downlink, respectively.

4. A method of a femto Base Station (BS) for interference alleviation in a wireless communication system with a hierarchical cell layout, the method comprising:

acquiring an edge-band of the femto BS in a whole available frequency band; and restricting use of the edge-band and allocating a resource to a Mobile Station (MS) receiving a service from the femto BS, wherein the femto BS uses a same frequency band with a macro BS corresponding to the femto BS, wherein the edge-band is determined as a part band of the same frequency band used by the macro BS and the femto BS, and wherein the femto BS uses the edge-band at a lower power than a threshold power.

5. The method of claim 4, wherein, if the femto BS uses a single carrier, the edge-band is constructed in a subcarrier unit and, if the femto BS uses a multi-carrier, is constructed in a carrier unit.

6. The method of claim 4, wherein the edge-band is constructed in different frequency positions or different sizes for uplink and downlink, respectively.

7. The method of claim 4, wherein restricting the use of the edge-band and allocating the resource comprises allocating a frequency band that does not include the edge-band to an MS receiving a service from the femto BS.

8. The method of claim 4, wherein restricting the use of the edge-band and allocating the resource comprising:

allocating the edge-band to MSs of good channel states among MSs receiving a service from the femto BS; and controlling transmission/reception of a low-power signal through the edge-band.

9. An apparatus of a macro Base Station (BS) for interference alleviation in a wireless communication system with a hierarchical cell layout, the apparatus comprising:

a storage unit for storing edge-bands of femto BSs that are included within an area of the macro BS; and a scheduler for determining whether a Mobile Station (MS) receiving a service from the macro BS exists in an area adjacent to a femto BS included within the area of the macro BS and, if the MS is located in the area adjacent to the femto BS, allocating, to the MS, an edge-band of the femto BS to which the MS is adjacent, wherein the macro BS and the femto BS use a same frequency band, wherein the edge-band is determined as a part band of the same frequency band used by the macro BS and the femto BS, and wherein the femto BS use the edge-band at a lower power than a threshold power.

10. The apparatus of claim 9, wherein, if the femto BS uses a single carrier, the edge-band is constructed in a subcarrier unit and, if the femto BS uses a multi-carrier, the edge-band is constructed in a carrier unit.

11. The apparatus of claim 9, wherein the edge-band is constructed in different frequency positions or different sizes for uplink and downlink, respectively.

12. An apparatus of a femto Base Station (BS) for interference alleviation in a wireless communication system with a hierarchical cell layout, the apparatus comprising:

an edge-band manager for acquiring an edge-band of the femto BS in a whole available frequency band; and a scheduler for restricting the use of the edge-band and allocating a resource to a Mobile Station (MS) receiving a service from the femto BS, wherein the femto BS uses a same frequency band with a macro BS corresponding to the femto BS, wherein the edge-band is determined as a part band of the same frequency band used by the macro BS and the femto BS, and wherein the femto BS uses the edge-band at a lower power than a threshold power.

13. The apparatus of claim 12, wherein, if the femto BS uses a single carrier, the edge-band is constructed in a subcarrier unit and, if the femto BS uses a multi-carrier, the edge-band is constructed in a carrier unit.

14. The apparatus of claim 12, wherein the edge-band is constructed in different frequency positions or different sizes for uplink and downlink, respectively.

15. The apparatus of claim 12, wherein the scheduler allocates a frequency band that does not include the edge-band to the MS receiving the service from the femto BS.

16. The apparatus of claim 12, wherein the scheduler allocates the edge-band to MSs of good channel states among MSs receiving the service from the femto BS, and controls to transmit/receive a signal at low power through the edge-band.

17. The method of claim 1, wherein the macro BS sets the edge-band of the femto BS and the macro BS provides information regarding edge-bands to the femto BS.

18. The method of claim 1, wherein the femto BS sets the edge-band of the femto BS and provides information regarding edge-bands to the macro BS.

19. The method of claim 1, wherein the edge-band of the femto BS is set by a service provider.

20. The method of claim 1, wherein determining whether the MS is located in the area adjacent to the femto BS comprises using at least one of Position information of the MS, area information of the MS, and a Signal to Interference plus Noise Ratio (SINR) of a signal received from the MS.

21. The method of claim 4, wherein a macro BS sets the edge-band of the femto BS and provides information regarding edge-bands to the femto BS.

22. The method of claim 4, wherein the femto BS sets the edge-band of the femto BS and provides information regarding edge-bands to a macro BS.

23. The method of claim 4, wherein the edge-band of the femto BS is set by a service provider.

24. The apparatus of claim 9, wherein the macro BS sets the edge-band of the femto BS and provides information regarding edge-bands to the femto BS.

25. The apparatus of claim 9, wherein the femto BS sets the edge-band of the femto BS and provides information regarding edge-bands to the macro BS.

26. The apparatus of claim 9, wherein the edge-band of the femto BS is set by a service provider.

27. The apparatus of claim 9, wherein the scheduler determines whether the MS is located in the area adjacent to the femto BS using at least one of Position information of the MS, area information of the MS and a Signal to Interference plus Noise Ratio (SINR) of a signal received from the MS.

28. The apparatus of claim 12, wherein a macro BS sets the edge-band of the femto BS and provides information regarding edge-bands to the femto BS.

29. The apparatus of claim 12, wherein the femto BS sets the edge-band of the femto BS and provides information regarding edge-bands to a macro BS.

30. The apparatus of claim 12, wherein the edge-band of the femto BS is set by a service provider.

31. The method of claim 1, wherein the femto BS within the area of the macro BS has an edge-band of a different frequency position or a different size than other femto BSs within the area of the macro BS, or the femto BS forms at least one group of femto BSs with other femto BSs within the area of the macro BS according to positions of each femto BS, and the at least one group has an edge-band of a different frequency position or a different size than other groups within the area of the macro BS.

32. The method of claim 4, wherein the femto BS has an edge-band of a frequency position or size different from those of other femto BSs within an area of the same macro BS, or the femto BS forms a group with other femto BSs within the area of the same macro BS according to a position of the femto BS, and has an edge-band of a different frequency position or a different size than other groups of femto BSs within the area of the same macro BS.

33. The apparatus of claim 9, wherein the femto BS within the area of the macro BS has an edge-band of a different frequency position or a different size than other femto BSs within the area of the macro BS, or the femto BS forms at least one group of femto BSs with other femto BSs within the area of the macro BS according to positions of each femto BS, and the at least one group has an edge-band of a different frequency position or a different size than other groups within the area of the macro BS.

34. The apparatus of claim 12, wherein the femto BS within an area of the macro BS has an edge-band of a different frequency position or a different size than other femto BSs within the area of a same macro BS, or the femto BS forms at least one group of femto BSs with other femto BSs belonging within the area of the same macro BS according to positions of each femto BS and the at least one group has an edge-band of a different frequency position or a different size than other groups within the area of the same macro BS.

* * * * *